UNITED STATES PATENT OFFICE.

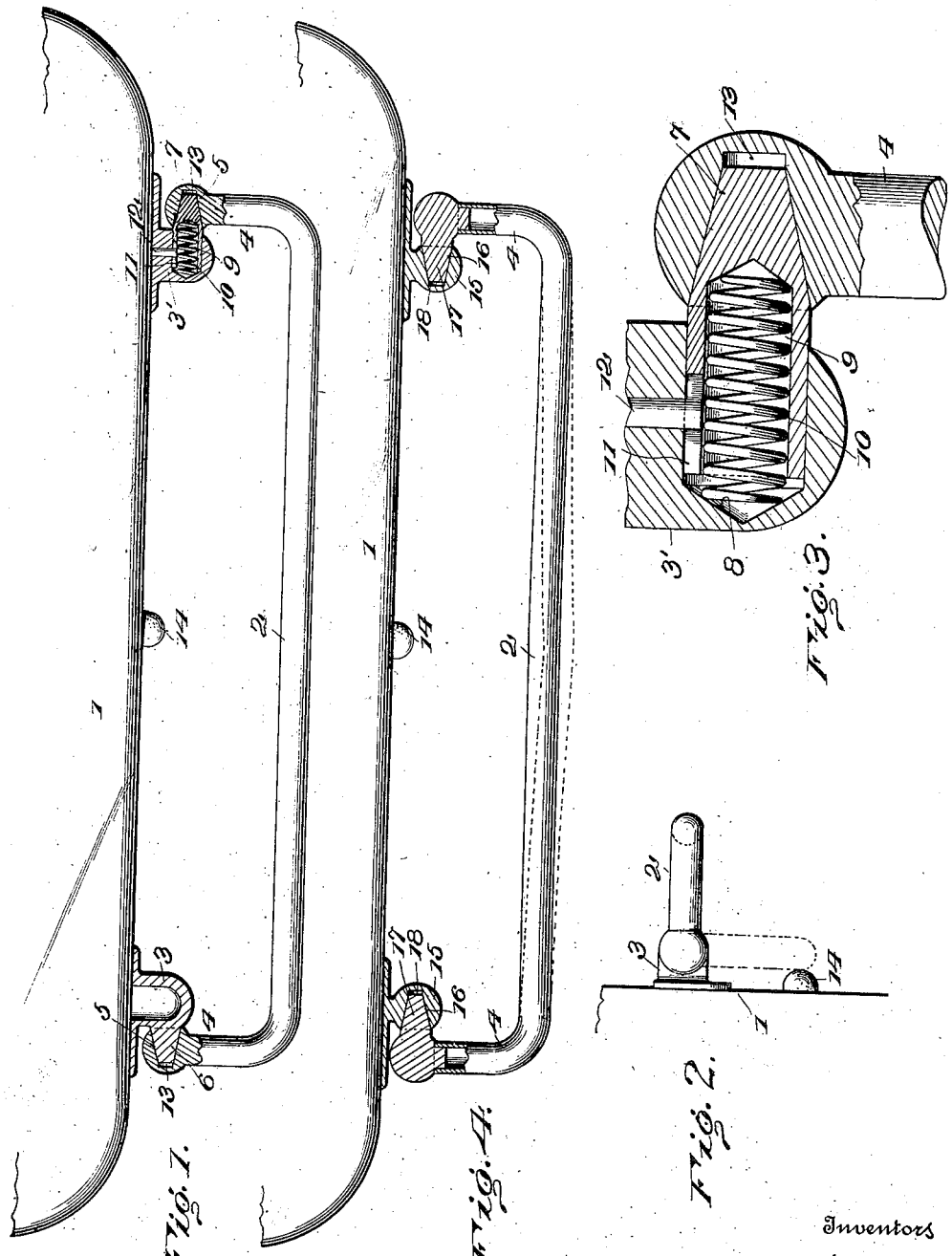

ALEXANDER WINTON AND HAROLD B. ANDERSON, OF CLEVELAND, OHIO, ASSIGNORS TO THE WINTON MOTOR CARRIAGE COMPANY, OF CLEVELAND, OHIO.

ROBE-RAIL FOR AUTOMOBILES.

1,041,549.  Specification of Letters Patent.  Patented Oct. 15, 1912.

Application filed September 11, 1911. Serial No. 648,801.

*To all whom it may concern:*

Be it known that we, ALEXANDER WINTON and HAROLD B. ANDERSON, citizens of the United States, residing at Cleveland, in the county of Cuyahoga and State of Ohio, have invented certain new and useful Improvements in Robe-Rails for Automobiles, of which the following is a specification, reference being had therein to the accompanying drawing.

This invention relates to improvements in robe rails for automobiles, and the object of which is to provide a robe rail adapted to be folded to variable distances between the rail and the body of the automobile, whereby variable thicknesses of articles can be placed on the rail and rigidly held thereby.

In the accompanying drawings—Figure 1 is a top plan view partly in section of one form of the improved robe rail, the same being partially shown in section. Fig. 2 is an end elevation of Fig. 1, the rail shown lifted in full lines and in its extreme folded position in dotted lines. Fig. 3 is an enlarged sectional view of the form of friction device shown in Fig. 1. Fig. 4 is a top plan view of the improved robe rail partially in section and showing another way of accomplishing the frictional effect.

This improved robe rail is particularly intended to be used in the tonneau of automobiles and is supported at the back of the front seat thereof, for the purpose of receiving robes, shawls and similar articles and to rigidly hold them between the rail and the back of the front seat or body of the vehicle.

Referring now to the drawings, 1 indicates the front seat of a tonneau of the automobile, and 2 the robe rail. This rail is essentially U-shaped in form and has its ends pivotally supported by plates or brackets 3 and 3', which are attached to the back of the front seat 1. The pivotal connection between the rail and the supporting plates or brackets in the two forms here shown, comprises tapered members which are frictionally held by spring tension, whereby the rail turns or hinges on frictional bearings and is thereby held in its adjusted position.

In the form shown in Fig. 1, the ends 4 of the rail are provided with tapered recesses 5. One of these tapered recesses 5 receives a corresponding tapered bearing 6, which is made rigid with the supporting bracket 3, while the tapered recess 5, at the other end of the rail, receives a spring projected tapered bearing 7. The tapered bearing 7, in the form shown in Fig. 1, is longitudinally movable in an opening 8, in the bracket 3' and the bearing is provided with a longitudinal opening 9, which receives an expanded helical spring 10, the outer end of which engages the outer end of the opening 9, and the inner end of which engages the end wall of the opening 8. To prevent the turning of the tapered bearing 7, it is provided with a longitudinal slot 11, into which a pin 12 carried by the bracket projects. The tapered apertures 5 in the ends of the rail extend beyond the ends of the bearings, as shown at 13, the object of which is to permit the relative endwise movement of the rail and bearings when they become worn.

The spring projected bearing 7 serves to force itself tightly into its tapered aperture 5 and also causes an endwise tension on the rail which forces the tapered bearing 6, of the other bracket tightly in its tapered recess. This action causes a frictional bearing or contact between the rail and its supporting brackets which will prevent any rattling of the rail either when there is or is not a robe or other similar article thereon. A rubber projection 14 extends from the back of the seat 1 to engage the rail when it is empty and carried to its extreme folded position, as shown in Fig. 2, to prevent the marring of the varnish by the engagement of the rail with the back of the seat. By means of this folding frictional rail it is adapted to receive and to rigidly clamp variable thicknesses of an article or plurality of articles placed thereon and to firmly clamp them between the rail and the back of the seat, thus preventing them from being shaken off and falling on the floor of the tonneau by the jarring of the vehicle when in motion, which is a very common occurrence and is objectionable.

In Fig. 4, another form of providing a variable adjustable frictional folding robe rail is shown. In this form the spring action is accomplished by the laterally buckling or bending of the rail 2. In this latter form the supporting brackets 15 are provided with tapered recesses 16, which receive inwardly or oppositely projecting tapered bearings 17, rigidly carried by the ends 4 of the rail 2. The bearing recesses in this form are also elongated, as shown at 18, for the same purpose for which they are elongated in Fig. 1.

Spring tension is effected between the tapering bearings 17 and their receiving recesses 16 by laterally bending or buckling the rod 2, as shown in dotted lines, before it is applied to the vehicle. In applying this form to its supporting brackets the supporting brackets are sufficiently separated to cause the strengthening of the rail against its lateral bend which causes the bearings to have an endwise frictional thrust in their tapered apertures.

It will be observed that in both of the forms here shown for causing the frictional tension between the rail and its supporting bracket, the placing of the articles on the rail will tend to increase this frictional effect.

Having thus described this invention, what is claimed and desired to secure by Letters Patent is—

1. In a folding robe-rail for automobiles, the combination with a seat back, of two separated projecting brackets secured thereto, a U-shaped rail, the ends of the rail and the brackets having tapered friction bearings, and spring means forcing the said tapered friction bearings into engagement for the purpose described.

2. In a folding robe-rail for automobiles, the combination with a seat-back, of two separated projecting brackets secured thereto, of a one-piece U-shaped rail, the rail and brackets having respectively telescoping tapered recesses and projections, the main portion of the rail having normally a lateral bend to cause friction between said projections and the walls of the recesses for the purpose described.

In testimony whereof we hereunto affix our signatures in the presence of two witnesses.

ALEXANDER WINTON.
HAROLD B. ANDERSON.

Witnesses:
  W. J. WARD,
  G. M. LAVELLE.